US011548435B2

(12) United States Patent
Kim et al.

(10) Patent No.: US 11,548,435 B2
(45) Date of Patent: Jan. 10, 2023

(54) LIGHTING DEVICE WHICH CAN BE USED FOR CAMPING AND LEISURE AND HAS VEHICLE SAFETY WARNING LIGHT AND FIRE DETECTION FUNCTIONS

(71) Applicant: Tae-Young Kim, Seoul (KR)

(72) Inventors: Tae-Young Kim, Seoul (KR); Dong-Choon Koo, Seoul (KR)

(73) Assignee: Tae-Young Kim, Seoul (KR)

( * ) Notice: Subject to any disclaimer, the term of this patent is extended or adjusted under 35 U.S.C. 154(b) by 570 days.

(21) Appl. No.: 16/303,702

(22) PCT Filed: Apr. 27, 2017

(86) PCT No.: PCT/KR2017/004511
§ 371 (c)(1),
(2) Date: Dec. 18, 2020

(87) PCT Pub. No.: WO2017/209398
PCT Pub. Date: Dec. 7, 2017

(65) Prior Publication Data
US 2021/0122289 A1   Apr. 29, 2021

(30) Foreign Application Priority Data

May 31, 2016   (KR) .......................... 10-2016-0067771

(51) Int. Cl.
*B60Q 1/52* (2006.01)
*B60Q 1/26* (2006.01)
(Continued)

(52) U.S. Cl.
CPC ............. *B60Q 1/52* (2013.01); *B60Q 1/2615* (2013.01); *B60Q 5/005* (2013.01); *B60Q 7/00* (2013.01)

(58) Field of Classification Search
USPC .......................... 340/471, 472, 473, 628, 321
See application file for complete search history.

(56) References Cited

U.S. PATENT DOCUMENTS

| 5,268,671 A * | 12/1993 | Novotny ................ G08B 13/08 340/545.2 |
| 2007/0096009 A1* | 5/2007 | Ziemkowski .......... G03B 15/05 250/206.1 |
| 2017/0370531 A1* | 12/2017 | Cai ......................... F21K 9/278 |

FOREIGN PATENT DOCUMENTS

| JP | 2010114055 A | 5/2010 |
| KR | 101192723 B1 | 10/2012 |

OTHER PUBLICATIONS

International search report of PCT/KR2017/004511, dated Jul. 21, 2017, English translation.
(Continued)

*Primary Examiner* — Brent Swarthout
(74) *Attorney, Agent, or Firm* — STIP Law Group, LLC (57) ABSTRACT

A lighting device equipped at all times in a vehicle, which can be used for camping and leisure and has a function of a safety warning light of the vehicle, according to the present invention, comprises: a rectangular-shaped fixing plate having a pair of first magnet members which are disposed horizontally; a "C"-shaped front insertion groove which is formed on the front surface of the fixing plate and is formed to be adjacent to the edges of the fixing plate excluding the upper or lower edge of the fixing plate; a "C"-shaped first support member which is selectively fixed to the front insertion groove and is installed rotatably toward the front surface with respect to the fixing plate by the medium of a hinge; a pair of side surface insertion grooves which are longitudinally formed on the respective sides of the fixing plate; a pair of second support members which are respectively coupled to the inside of the side surface insertion grooves by the medium of a hinge, and are unfolded in a direction opposite to the first support member; a light unit which has, on the rear surface thereof, a second magnet member coupled to the first magnet members, has a battery
(Continued)

embedded therein, and has a lighting device on the front surface thereof; and a cover which is rotatably coupled to the light unit by the medium of a hinge so as to selectively cover the lighting device, wherein the lighting device may flicker when the lighting device is covered by the cover.

3 Claims, 11 Drawing Sheets

(51) Int. Cl.
*B60Q 5/00* (2006.01)
*B60Q 7/00* (2006.01)

(56) References Cited

OTHER PUBLICATIONS

Impact Qualite 300V-2012 Focusing Flood Light(300w/120V), Retried from the Internet: <URL: https://www.amazon.com/Impact-Qualite-V-2012-Focusing-Flood/dp/B00G4L8YSE/ref=cm_cr_arp_d_product_top?ie=UTF8>, Oct. 23, 2013, p. 1, figures of the top-left, Seattle, USA.

* cited by examiner

LIGHTING DEVICE WHICH CAN BE USED FOR CAMPING AND LEISURE AND HAS VEHICLE SAFETY WARNING LIGHT AND FIRE DETECTION FUNCTIONS

CROSS-REFERENCE TO RELATED APPLICATIONS

This application is the U.S. National Phase under 35 U.S.C. § 371 of International Application No. PCT/KR2017/004511 filed on Apr. 27, 2017, which in turn claims the benefit of Korean Application No. KR10-2016-0067771, filed on May 31, 2016, the disclosures of which are incorporated by reference into the present application.

TECHNICAL FIELD

The present invention relates to a lighting device which can be used for camping and leisure and has vehicle safety warning light and fire detection functions, and more particularly, to a lighting device which can be used for camping and leisure and has vehicle safety warning light and fire detection functions, in which the lighting device is equipped at all times in a vehicle, functions as an interior lamp normally, is utilized in camping and leisure activities, and has a safety warning light function when the vehicle is stopped or parked on a shoulder of a road, wherein the lighting device is able to be attached to anywhere outside the vehicle, and the lighting device is easily attached and detached to and from an Oxford fabric in a parasol, a tarpaulin, a tent or the like, which is not formed of a metal material, through mutual magnetism of a fixing plate. The present invention claims the benefit of Korean Patent Application Publication No. 10-2016-0067771 filed on May 31, 2016, the entire contents of which are incorporated herein by reference.

BACKGROUND ART

The majority of drivers would have an experience of unavoidably stopping/parking on a shoulder of a road due to excessive fatigue, drowsiness, or a breakdown while driving a vehicle on a highway.

Currently, a rear-end collision accident of a vehicle stopped/parked on the shoulder of the road, which is ranked as the first in fatal accidents of the highway, leads to a serious consequence.

Probably, the drivers are too accustomed to tail lights and hazard flasher lamps of the vehicle in their field of vision, resulting in less awareness inadvertently.

In addition, since there is a growing trend in leisure such as camping currently due to improvement in standard of living and utilization of a leisure time, it is an undeniable fact that the camping is a general way of easily getting in touch with nature with a family, relatives, or acquaintances as a deviation from a busy city life.

With prosperity of a leisure industry, countless convenience apparatuses are produced and sold.

In general, the camping or leisure activities are performed in touch with nature, so that it is necessary to prepare various convenience apparatuses.

Among the convenience apparatuses, since a user has to stay a dark night inevitably, the first priority may be a lighting device, followed by cooking utensils such as a burner, a table, a tent and the like.

Commercially available lighting devices, which are essential items, are immeasurably flooded. In addition, the lighting devices which may be carried in several numbers by anyone with camping equipment cannot be installed and seated at will. Most lighting devices on the market are not easy to be installed and seated at will, for example, have an ambiguous installation structure, so that the lighting devices are hung in a swinging state.

In addition, lighting devices used in a tent are mainly lighting devices hung on a frame inside the tent, in which the frame of the tent is produced to have a predetermined curvature for all parts except for a ceiling side.

Accordingly, there is a restriction that the lighting device has to be installed at the frame on the ceiling side in the tent, so that it is difficult for the user to adjust light to a desired position.

As the related art associated with the above configuration, there is disclosed Korean Patent Registration No. 10-1580245 (entitled "camping LED lantern for freely adjusting light angle", and registered on Dec. 18, 2015).

DISCLOSURE

Technical Problem

To solve the problems described above, an object of the present invention is to provide a lighting device which can be used for camping and leisure and has vehicle safety warning light and fire detection functions, which may be attached at all times to an inside a leisure vehicle such as an SUV or an RV, a fixed window, etc.

In addition, an object of the present invention is to provide a lighting device which can be used for camping and leisure and has vehicle safety warning light and fire detection functions, which may be attached to an exterior of a vehicle at a suitable time and place in case of emergency such as the stopping or the parking on the shoulder of the road during the driving of the vehicle, and may provide a powerful safety warning light function which is incomparable with a safety warning light function of an existing vehicle flasher lamp.

Technical Solution

To achieve the objects described above, according to the present invention, there is provided a lighting device which can be used for camping and leisure and has vehicle safety warning light and fire detection functions, the lighting device including: a fixing plate having a rectangular shape, and provided with a pair of first magnet members which are disposed on right and left sides of the fixing plate; a first detection sensor provided on a lower front surface of the fixing plate; a "C"-shaped front insertion groove formed on a front surface of the fixing plate while being adjacent to edges of the fixing plate excluding an upper edge of the fixing plate; a "C"-shaped first support member selectively fixed to the front insertion groove, and rotatable toward a front side of the fixing plate through a hinge; a pair of side insertion grooves formed vertically on both sides of the fixing plate; a pair of second support members respectively coupled to insides of the side insertion grooves through a hinge, and unfolded in a direction opposite to the first support member; a light unit provided on a rear surface thereof with a second magnet member detachably attached to the first magnet member, accommodated therein with a battery, and provided on a front surface thereof with an illumination device; a second detection sensor provided on an upper rear surface of the light unit, and activated by approaching the first detection sensor when the light unit is vertically inverted and attached to the fixing plate by a user;

a fire detection sensor provided on an upper surface of the light unit, operated only when the second detection sensor is in an activation state, and activated when a fire is detected; a buzzer provided on the upper surface of the light unit, and activated when the fire detection sensor is activated; and a cover rotatably coupled to the light unit through a hinge to selectively cover the illumination device, wherein the illumination device flickers when the illumination device is covered by the cover.

In addition, the lighting device may further include: a base plate having a rear surface attached to a window in the vehicle or a place for fixing the fixing plate, and provided on a front surface thereof with a plurality of coupling protrusions for coupling the base plate to the fixing plate; and a coupling hole foiled in the fixing plate, and having a predetermined vertical length, in which each of the coupling protrusions is fixedly fitted to the coupling hole.

In addition, the lighting device may further include: support brackets formed on right and left sides of the rear surface of the light unit; a rotation shaft provided at an end of the support bracket; and a housing coupled to the rotation shaft to rotate right and left, and accommodated therein with a second magnet member, wherein, when the light unit is attached to a curved surface, the light unit is tilted by the rotation shaft and attached to the curved surface of an exterior of the vehicle, the first support member is rotated and unfolded toward the front side when the light unit is coupled to the fixing plate, which is disposed at an outside of a tent, from an inside of the tent, and the second support member is unfolded in the direction opposite to the first support member to generate a tension in a cloth of the tent by a magnetic force of the first magnet member and the second magnet member such that the light unit and the fixing plate are fixed to the tent.

Advantageous Effects

As described above, the present invention can provide a vehicle safety warning light function which allows for attaching at all times to an inside the leisure vehicle such as the SUV or the RV, the fixed window, etc.

In addition, the present invention can provide a vehicle safety warning light function which allows for attaching to the exterior of the vehicle at the suitable time and place in case of emergency such as the stopping or the parking on the shoulder of the road during the driving of the vehicle, and providing the powerful safety warning light function which is incomparable with the safety warning light function of the existing vehicle flasher lamp.

In addition, in a cover of the present invention, a light-diffusing reflective film is coated on an inner side of a yellow-based transparent polarizing lens, so that a part of straight light can be reflected downward to illuminate an object brighter when the cover is opened at an angle of 90 degrees with respect to a head surface of the light unit, and glare problems can be prevented from occurring by shielding light in a portion of an illumination lamp at an eye level.

In addition, when the lighting device is attached to the exterior of the vehicle and used as a safety warning light, the present invention can provide a safety warning light function with a strong light amount by the lighting device flickering when a yellow light-shielding cover of the lighting device is closed.

In addition, the fixing plate, which is detachable from the base plate fixedly attached to the inside of the vehicle with a double-sided tape or the like, and the light unit are coupled to each other by a concave and convex configuration having mutual magnetism, so that detachment can be suppressed even when an impact is applied to a vehicle body due to an unpaved road or the like, and a pressing force can be increased when the coupling is performed by the magnetic force on a fabric of a tent or the like.

In addition, each of the magnet members provided on the rear surface of the light unit is rotatable at a predetermined angle so as to further provide a physical function of allowing optimal close contact in response to a shape of a curved surface or the like on the exterior of the vehicle, so that the light unit can make more close contact with the vehicle body and the fabric of the tent or the like.

In addition, when the fixing plate and the light unit are attached to each other by the magnetic force as described above, a tension for pressing a cloth of the tent is generated in the first support member and the second support member provided on the fixing plate, so that the fixing plate and the light unit can be firmly fixed to each other.

In addition, the illumination device of the light unit flickers when the illumination device is covered with the cover, so that the illumination device can be used as an emergency lamp of the vehicle when the cover is produced in an orange (or yellow) color.

In addition, when the magnet member provided on the rear surface of the light unit is installed to be rotatable right and left in a trunk of the vehicle, the light unit can be stably attached to a curved surface by rotating correspondingly to a shape of the trunk of the vehicle.

BEST MODE

[Mode for Invention]

Hereinafter, embodiments of the present invention will be described with reference to the accompanying drawings. The same reference numerals shown in the drawings denote identical elements. In describing the present invention, the detailed descriptions of well-known functions or configurations incorporated herein will be omitted so as not to make the subject matter of the present invention rather unclear.

Figure 1:
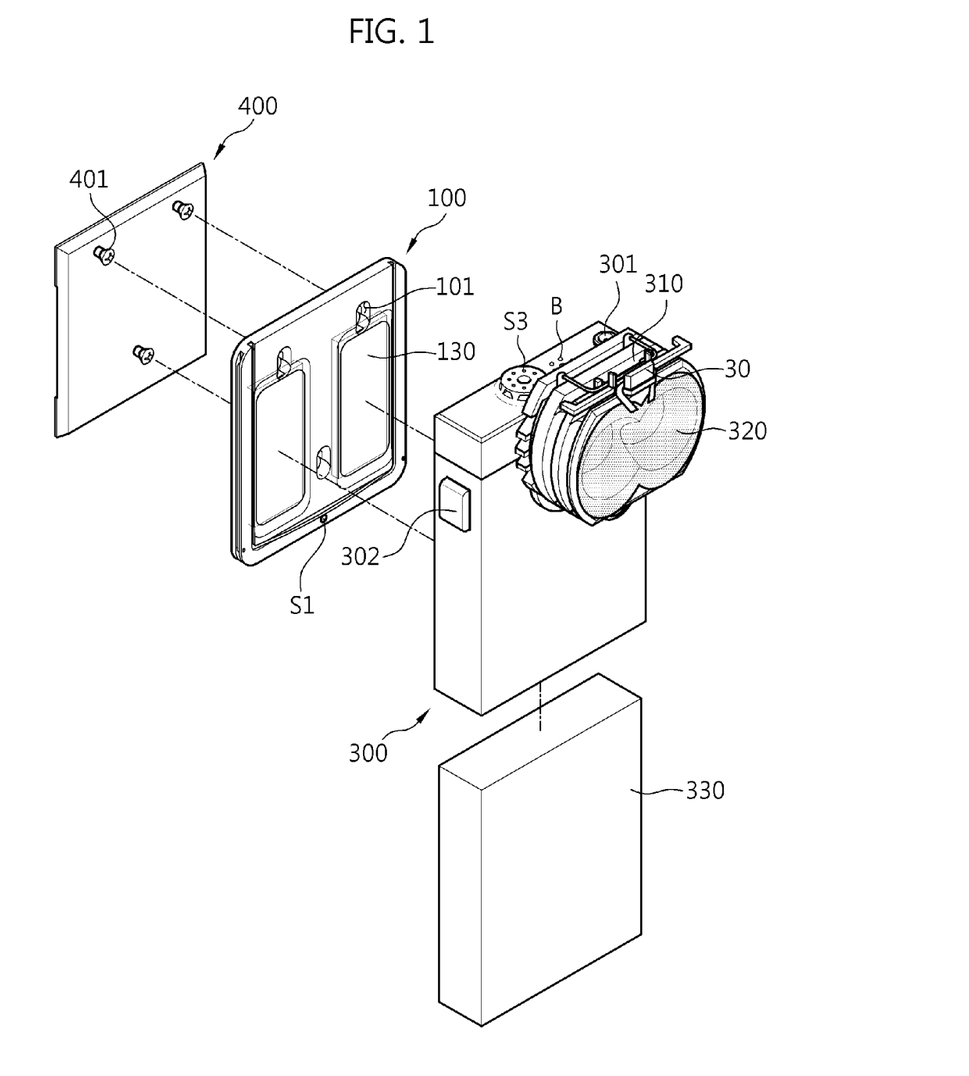
FIG. 1 is an exploded perspective view schematically showing an overall configuration of a lighting device which can be used for camping and leisure and has vehicle safety warning light and fire detection functions according to the present invention.
Figure 2:
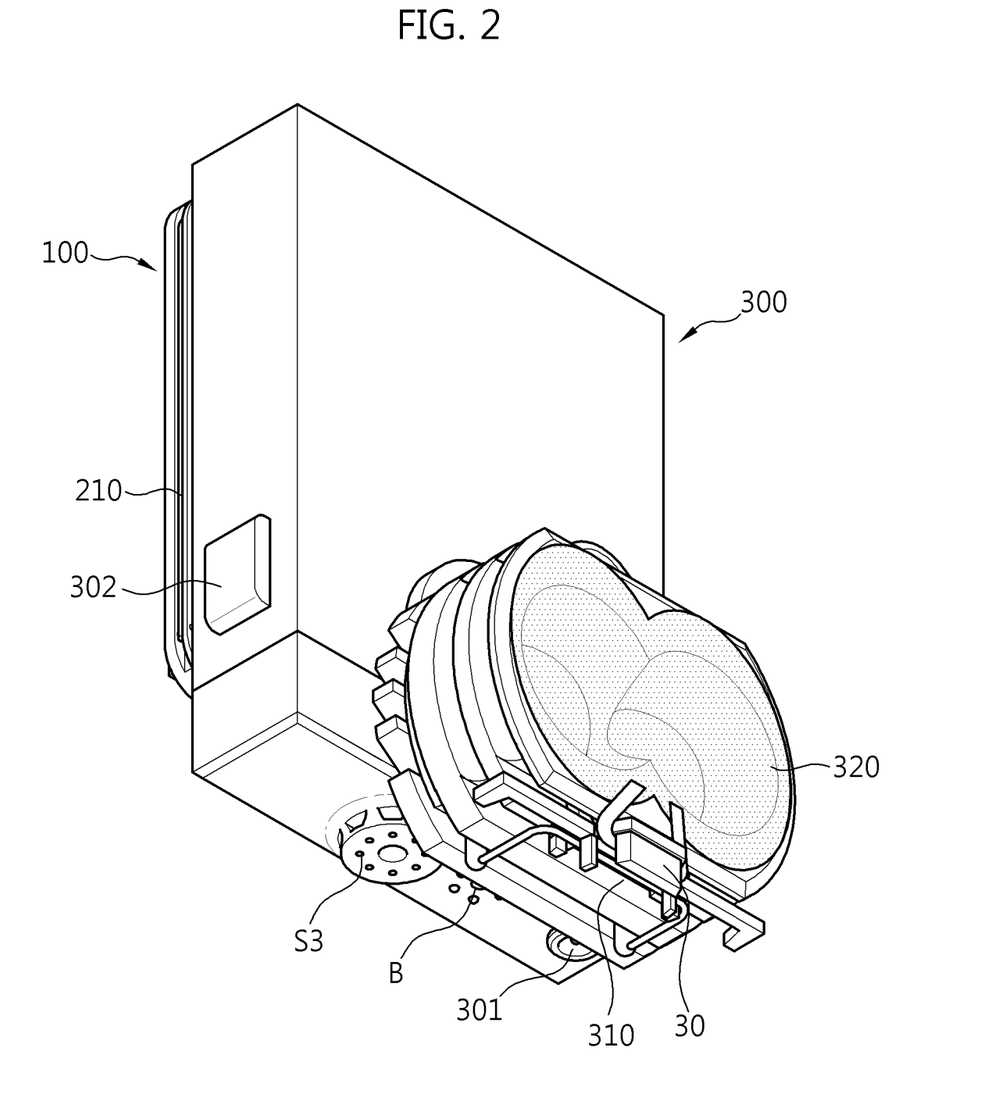
FIG. 2 is a view illustrating a case in which the lighting device which can be used for the camping and leisure and has the vehicle safety warning light and fire detection functions is used for fire detection according to the present invention.
Figure 3:
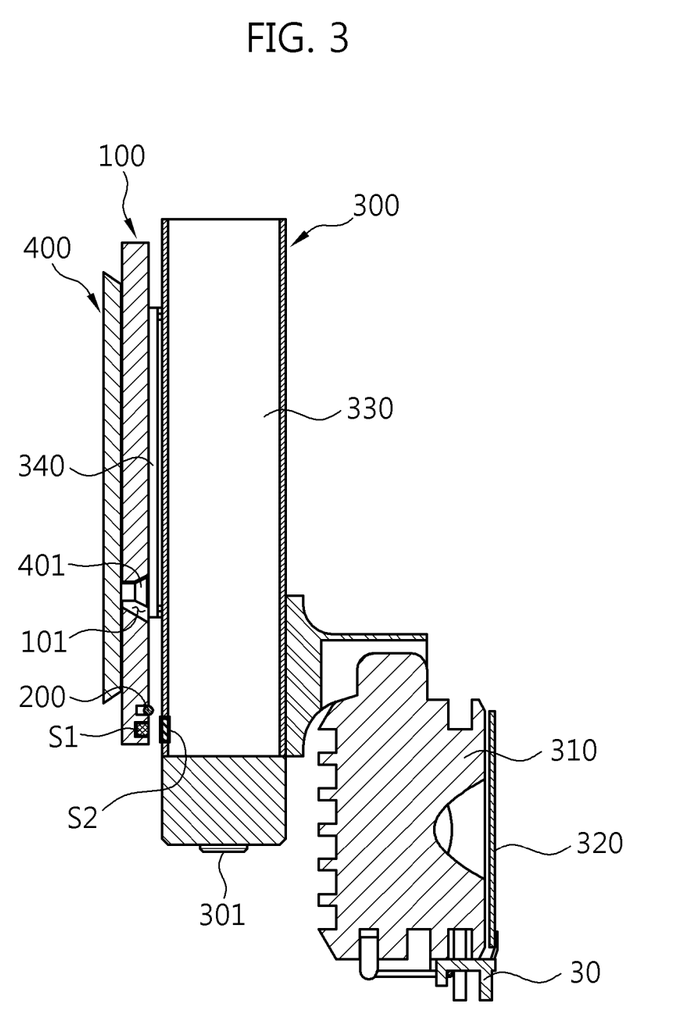
FIG. 3 is a cross-sectional view of FIG. 2.
Figure 4:
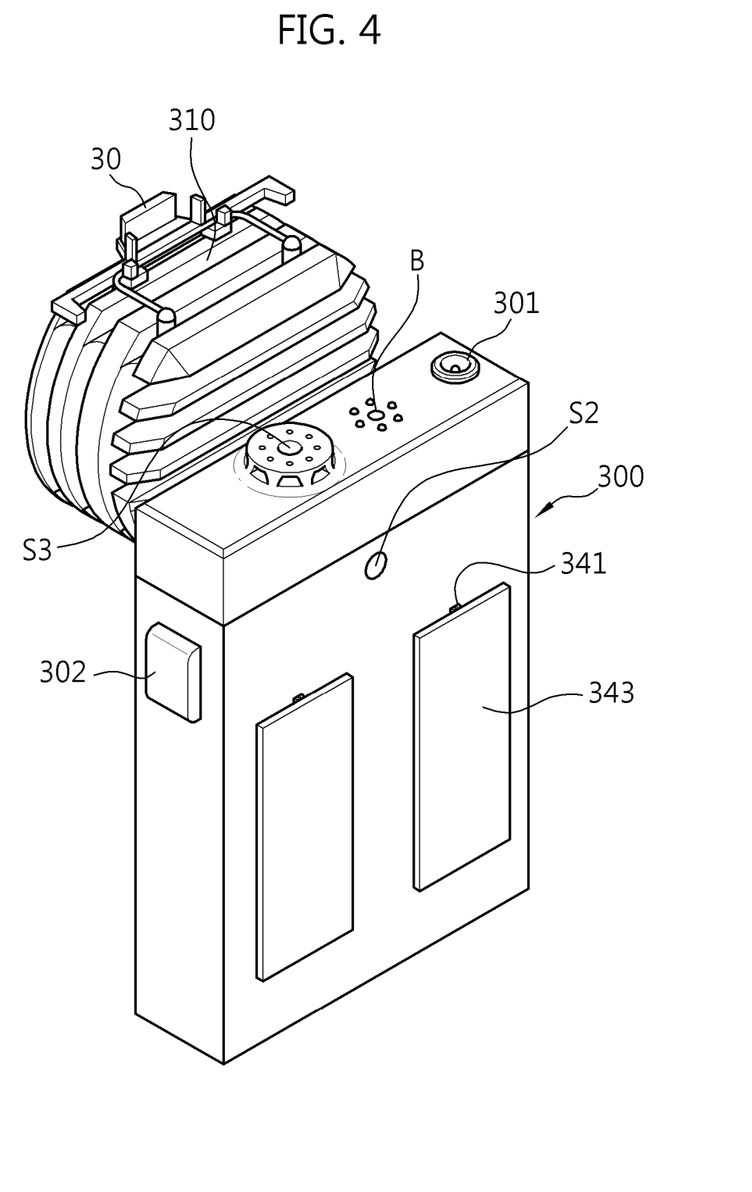
FIG. 4 is a perspective view showing a rear surface of a light unit of the lighting device which can be used for the camping and leisure and has the vehicle safety warning light and fire detection functions according to the present invention.
Figure 5:
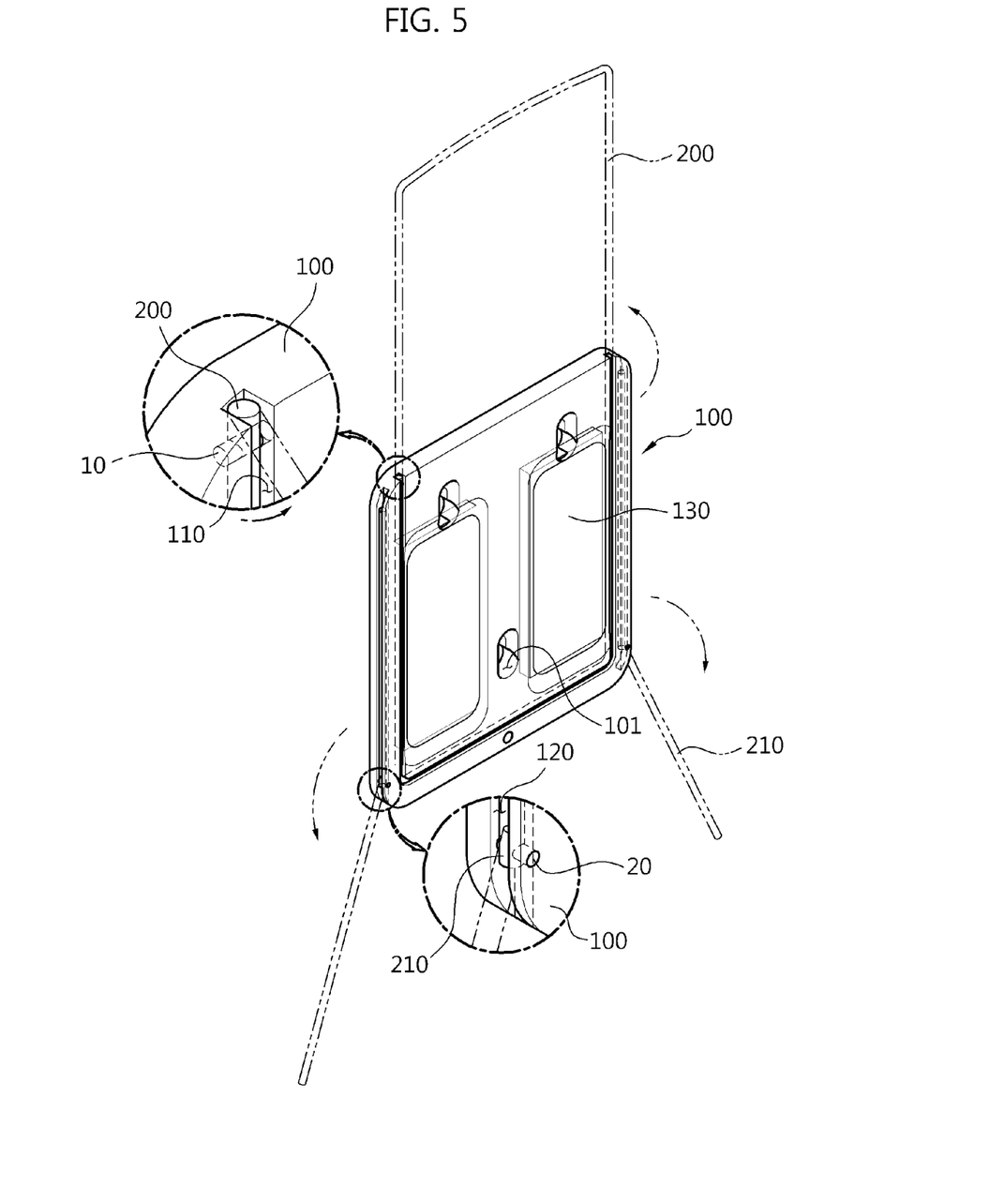
FIG. 5 is a conceptual diagram showing a state in which a first support member and a second support member of the lighting device which can be used for the camping and leisure and has the vehicle safety warning light and fire detection functions are unfolded in the fixing plate according to the present invention.
Figure 6:
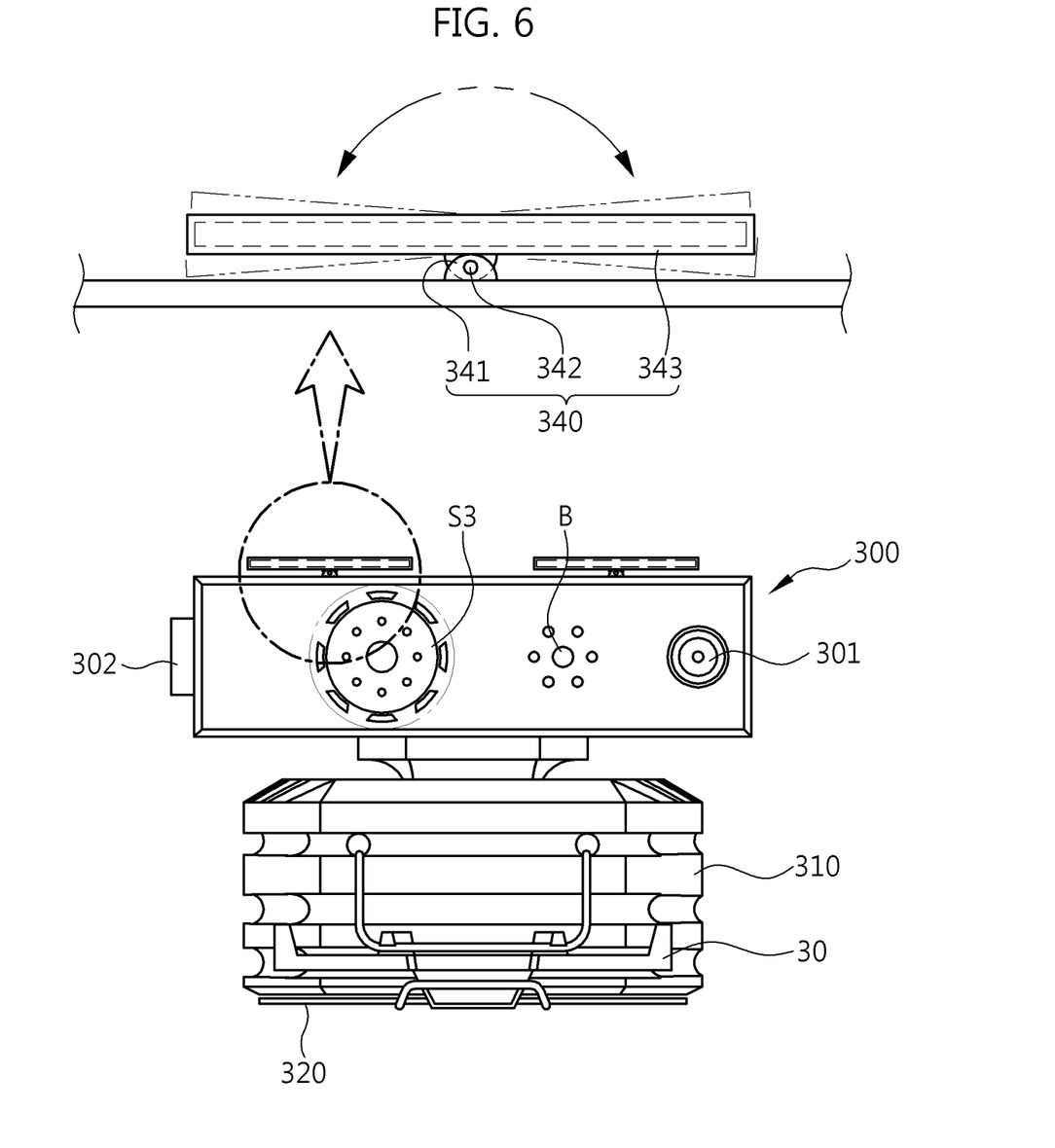
FIG. 6 is a plan view showing the overall configuration of the lighting device which can be used for the camping and leisure and has the vehicle safety warning light and fire detection functions and a conceptual view showing a state in which a support bracket is rotated according to the present invention.
Figure 7:
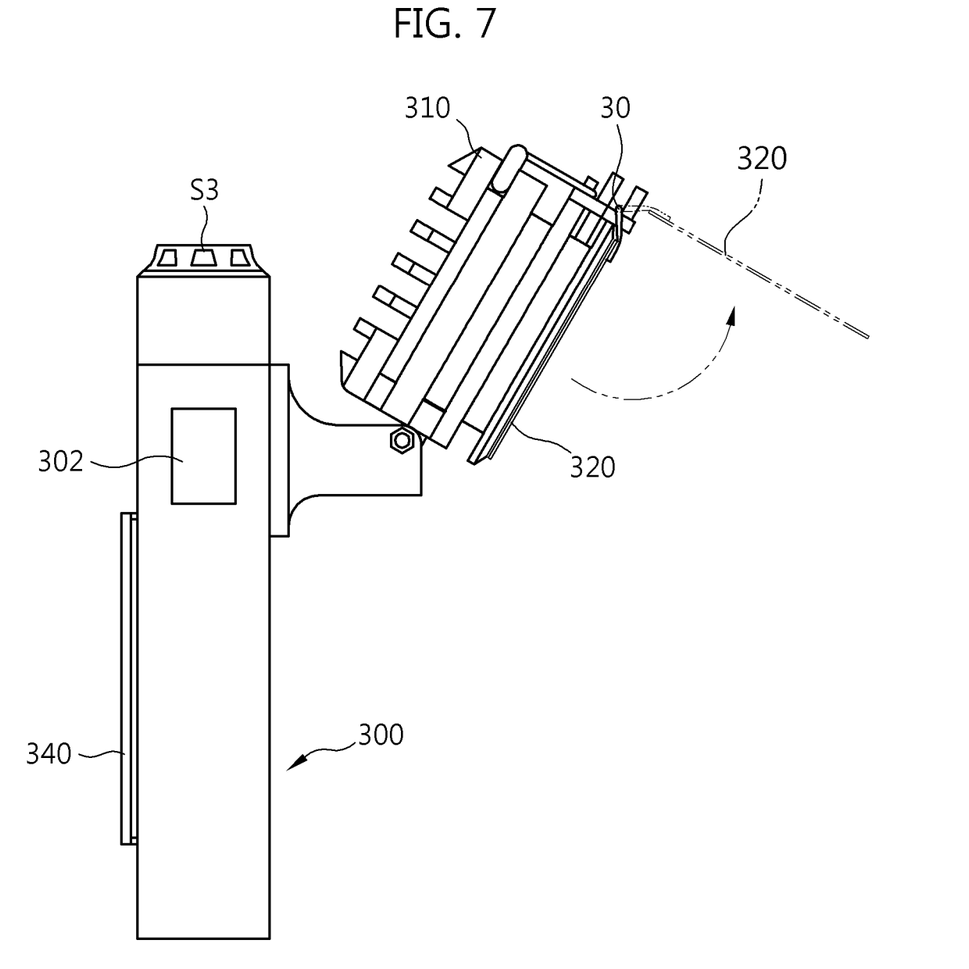
FIG. 7 is a side view showing a state in which a cover provided on a front surface of an illumination device of the lighting device which can be used for the camping and leisure and has the vehicle safety warning light and fire detection functions is opened and closed according to the present invention.
Figure 8:
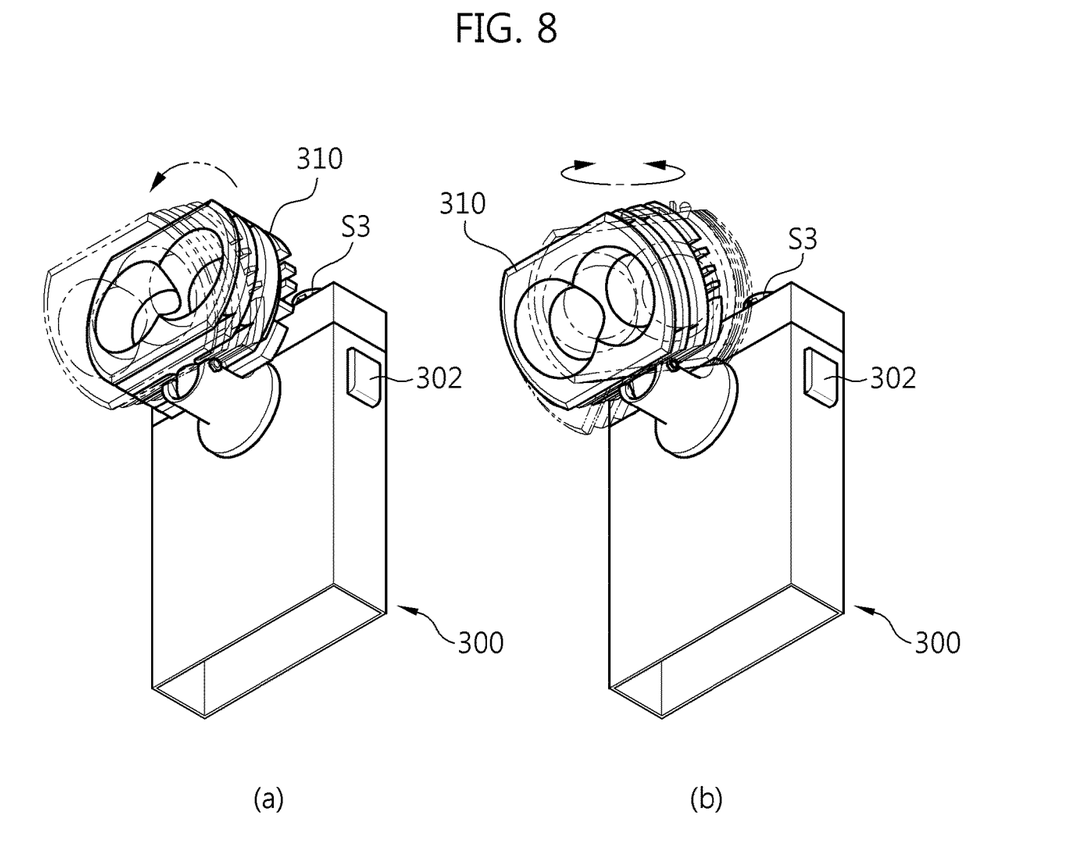
FIG. 8a and FIG. 8b are a bottom perspective view showing a state in which the illumination device of the lighting device which can be used for the camping and leisure and has the vehicle safety warning light and fire detection functions is rotated forward, rearward, right, and left according to the present invention.
Figure 9:
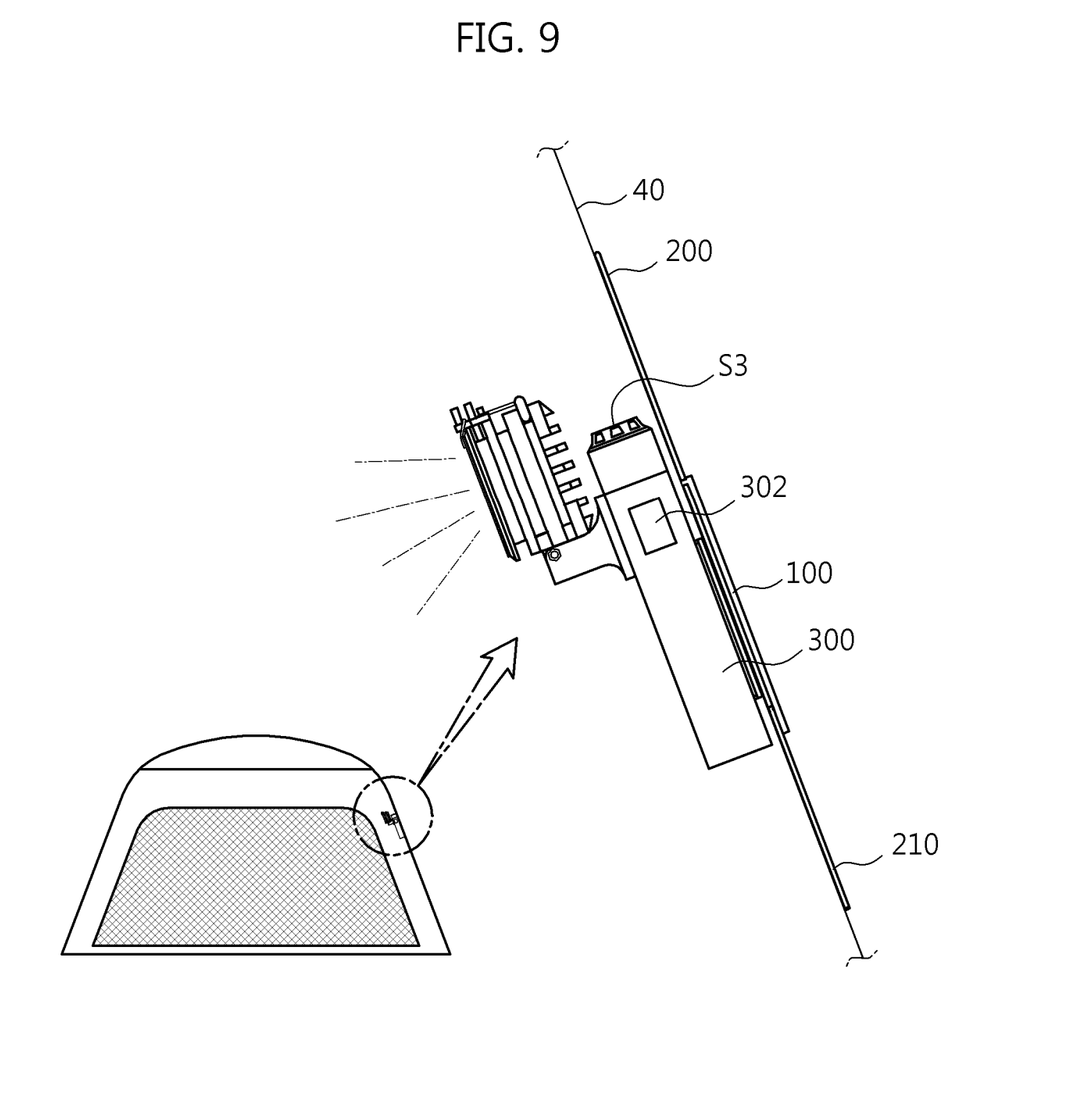
FIG. 9 is a view illustrating a state in which the lighting device which can be used for the camping and leisure and has the vehicle safety warning light and fire detection functions is installed on a cloth of a tent according to the present invention.
Figure 10:
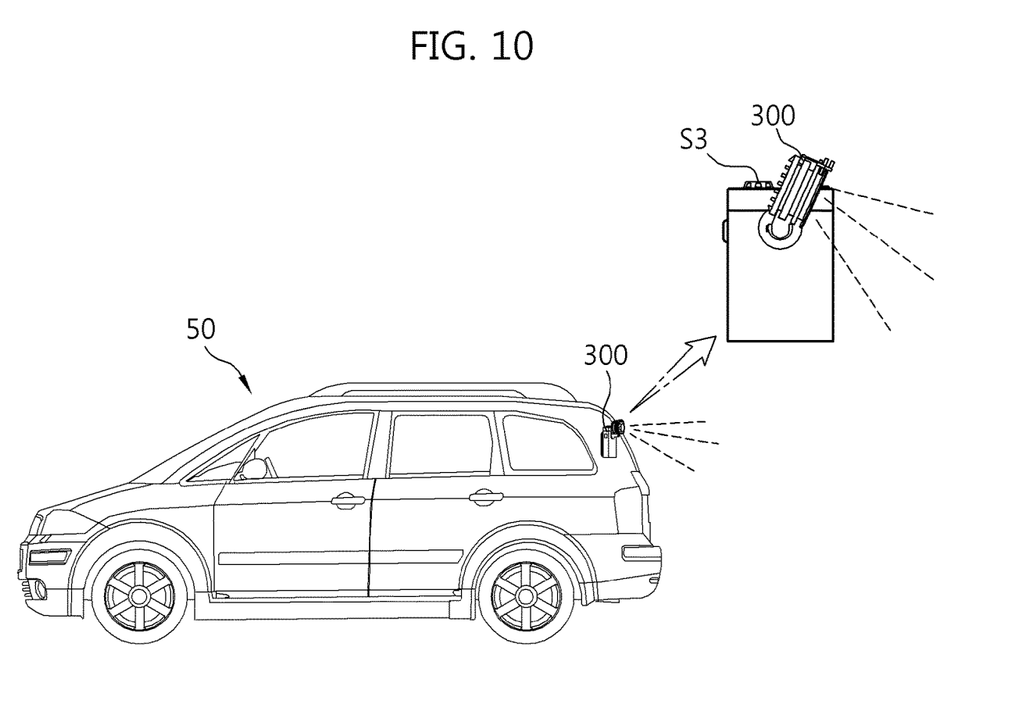
FIG. 10 is a view illustrating a state in which the lighting device which can be used for the camping and leisure and has the vehicle safety warning light and fire detection functions is installed at an exterior of a vehicle according to the present invention.
Figure 11:
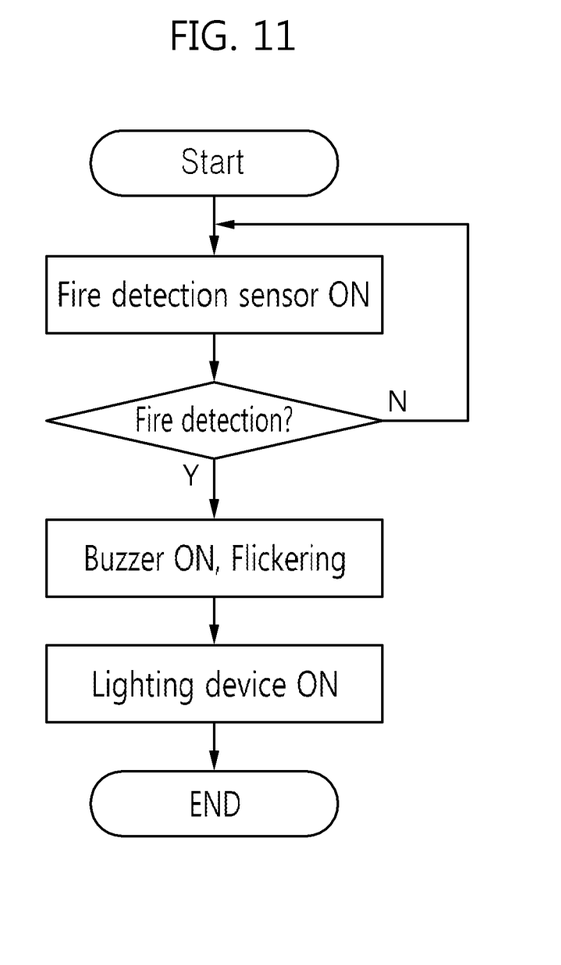
FIG. 11 is a flowchart showing an operation state of the lighting device which can be used for the camping and leisure and has the vehicle safety warning light and fire detection functions when a fire is detected according to the present invention.

FIG. 1 is an exploded perspective view schematically showing an overall configuration of a lighting device which can be used for camping and leisure and has vehicle safety warning light and fire detection functions according to the present invention; FIG. 2 is a view illustrating a case in which the lighting device which can be used for the camping and leisure and has the vehicle safety warning light and fire detection functions is used for fire detection according to the present invention; FIG. 3 is a cross-sectional view of FIG. 2; FIG. 4 is a perspective view showing a rear surface of a light unit of the lighting device which can be used for the camping and leisure and has the vehicle safety warning light and fire detection functions according to the present invention; FIG. 5 is a conceptual diagram showing a state in which a first support member and a second support member of the lighting device which can be used for the camping and leisure and has the vehicle safety warning light and fire detection functions are unfolded in the fixing plate according to the present invention; FIG. 6 is a plan view showing the overall configuration of the lighting device which can be used for the camping and leisure and has the vehicle safety warning light and fire detection functions and a conceptual view showing a state in which a support bracket is rotated according to the present invention; FIG. 7 is a side view showing a state in which a cover provided on a front surface of an illumination device of the lighting device which can be used for the camping and leisure and has the vehicle safety warning light and fire detection functions is opened and closed according to the present invention; FIG. 8 is a bottom perspective view showing a state in which the illumination device of the lighting device which can be used for the camping and leisure and has the vehicle safety warning light and fire detection functions is rotated forward, rearward, right, and left according to the present invention; FIG. 9 is a view illustrating a state in which the lighting device which can be used for the camping and leisure and has the vehicle safety warning light and fire detection functions is installed on a cloth of a tent according to the present invention; FIG. 10 is a view illustrating a state in which the lighting device which can be used for the camping and leisure and has the vehicle safety warning light and fire detection functions is installed at an exterior of a vehicle according to the present invention; and FIG. 11 is a flowchart showing an operation state of the lighting device which can be used for the camping and leisure and has the vehicle safety warning light and fire detection functions when a fire is detected according to the present invention.

According to the present invention, a lighting device equipped at all times in a vehicle, which can be used for camping and leisure and has a function of a safety warning light of the vehicle includes a fixing plate 100, a first detection sensor S1, a front insertion groove 110, a first support member 200, a side insertion groove 120, a second support member 210, a light unit 300, a second detection sensor S2, a fire detection sensor S3, a buzzer B, and a cover 320.

The present invention may be installed on a cloth 40 of a tent during the camping to provide light to an inside of the tent, and may be installed on a rear surface of a vehicle 50 in case of emergency such as a breakdown of the vehicle 50 to provide light for emergency.

In addition, the present invention may be installed indoors to detect a fire by the fire detection sensor and allow the buzzer to make a sound in an event of a fire, so that a loss of life due to the fire can be prevented.

First, a fixing plate 100 will be described.

As shown in FIGS. 1 to 3, the fixing plate 100 is substantially formed in a rectangular shape, and may be formed of a plastic material.

An edge of the fixing plate 100 formed in a rectangular shape as described above may be rounded so as not to cause abrasion on a hand of a user.

The fixing plate 100 as described above is provided with a pair of first magnet members 130, in which a first magnet member 130 may be detachably attached to a second magnet member 340 by a magnetic force.

In addition, the first support member 200 and the second support member 210, which will be described below, may be temporarily fixed to the front insertion groove 110 and the side insertion groove 120 by the magnetic force of the first magnet member 130, respectively.

Meanwhile, a plurality of coupling holes 101 may be perforated in the fixing plate 100, in which the coupling holes 101 may be fitted to coupling protrusions 401 provided on a front surface of a base plate 400, respectively.

For example, when the base plate 400 is installed in advance in glass or a place for installing the fixing plate 100 in the vehicle, the coupling protrusion 401 may be fitted to the coupling hole 101.

The coupling hole 101 may have a predetermined vertical length, and a lower portion of the coupling hole 101 may have a larger sectional area than a head portion of the coupling protrusion 401 so that the coupling hole 101 can be separated from the coupling protrusion 401.

Although it is preferable to provide three coupling protrusions 401 and three coupling holes 101 as shown in FIGS. 1 to 3, numbers of the coupling protrusions 401 and the coupling holes 101 are not limited thereto because two or more of the coupling protrusions 401 and the coupling holes 101 may prevent rotation.

Next, the first detection sensor S1 will be described.

As shown in FIG. 1, the first detection sensor S1 is a member disposed on a front surface of the fixing plate 100, and the first detection sensor S1 may be disposed on a lower front surface of the fixing plate 100 or an upper front surface of the fixing plate 100.

The first detection sensor S1 may be formed of, for example, a magnet. When the first detection sensor S1 is disposed adjacent to the second detection sensor S2 which will be described later as shown in FIGS. 2 and 3, the second detection sensor S2 may recognize a magnetic force of the first detection sensor S1, and the second detection sensor S2 may be activated.

It is to be noted that various embodiments of the first detection sensor S1 and the second detection sensor S2 other than the magnet type embodiment are possible.

Next, the front insertion groove 110 will be described.

The front insertion groove 110 is a groove formed in the front surface of the fixing plate 100, and as shown in FIG. 5, the front insertion groove 110 is formed adjacent to edges of the front surface of the fixing plate 100 except an upper edge of the fixing plate 100.

The front insertion groove 110 may have a substantial "C" shape, and the first support member 200 which will be described below may be selectively fixed to an inside of the front insertion groove 110.

In addition, as shown in a partially enlarged view of FIG. 5, a hinge 10 is provided inside the front insertion groove 110 to allow the first support member 200 which will be described later to rotate, and the hinge 10 may be provided on one side (upper side) or an opposite side (lower side) of the inside of the front insertion groove 110.

Next, the first support member 200 will be described.

The first support member 200 is a member formed of a metal material, in which the first support member 200 may be selectively fitted and fixed to the front insertion groove 110, and may have a substantial "C" shape so as to be easily coupled to the front insertion groove 110.

The first support member 200 as describe above may be coupled to the hinge 10 provided inside the front insertion groove 110 and rotated toward a front side of the fixing plate 100. Since the rotation of the first support member 200 is controlled by the front insertion groove 110, the first support member 200 may be rotated to an angle of about 180 degrees as shown in FIG. 5.

Meanwhile, a middle portion of the first support member 200 is preferably bent toward one side, in which the one side is a front direction in a state where the first support member 200 is fixed to the front insertion groove 110.

Accordingly, when the first support member 200 is taken out from the front insertion groove 110, the user may easily access the first support member 200, and, when the first support member 200 is unfolded, the first support member 200 may be bent to protrude toward an opposite side so as to press the cloth 40 of the tent, so that the fixing plate 100 may be firmly fixed to an exterior of the cloth 40 of the tent.

Next, the side insertion groove 120 will be described.

Side insertion grooves 120 are a pair of grooves formed on both sides of the fixing plate 100 described above, and the second support member 210 may be selectively fitted and fixed to the side insertion groove 120.

As shown in FIG. 5, the side insertion grooves 120 as described above vertically extend on the both sides of the fixing plate 100, and the second support member 210 is rotatably coupled to one side of the side insertion groove 120 through a hinge 20.

The hinge 20 provided in the side insertion groove 120 allows the first support member 200 and the second support member 210 to be rotated in an opposite direction at a position opposite to the hinge 20 provided in the front insertion groove 110 described above.

In addition, the hinge 20 provided in the side insertion groove 120 is provided with a stopper 21 to control a rotation angle of the second support member 210. The stopper 21 may make contact with a bottom surface of the side insertion groove 120 to control the rotation angle of the second support member 210, and the second support member 210 may be rotated about 120 to 150 degrees so as to be unfolded in a diagonal direction.

Next, the second support member 210 will be described.

The second support member 210 is a member rotatably coupled to the side insertion groove 120 described above through the hinge 20, in which the second support member 210 is formed of a metal material so that the second support member 210 may be temporarily fixed to the inside of the side insertion groove 120 by the first magnet member 130.

In addition, an end of the second support member 210 is preferably formed with a handle so that the second support member 210 may be easily drawn out from the side insertion groove 120.

The second support member 210 as described above may be rotated and unfolded in a direction opposite to a direction of the first support member 200. As shown in FIGS. 2 and 3, the first support member 200 is unfolded in an upward direction, and the second support member 210 is unfolded in a downward direction.

Accordingly, when the fixing plate 100 is installed at the exterior of the cloth 40 of the tent, the magnetic force of the first magnet member 130 and the second magnet member 340 serves as a force of pressing two upper portions and two lower portions of the cloth 40 of the tent, so that the fixing plate 100 and the light unit 300 which will be described below may be firmly fixed to the cloth 40 of the tent as shown in FIG. 9.

Next, the light unit 300 will be described.

The light unit 300 is a member which is detachably attached to the front surface of the fixing plate 100 by a magnetic force, in which a battery 330 is detachably attached inside the light unit 300 as shown in FIG. 1, and an illumination device 310 is provided on a front surface of the light unit 300.

The battery 330 may be a rechargeable battery, and the battery 330 may be coupled to a charging terminal 301 formed on an upper portion of the light unit 300 so as to be recharged.

The battery 330 as described above may be separated from the light unit 300 by a separation button 302, and may be replaced with another battery (not shown).

The illumination device 310 is a member for providing light to the user during outdoor activities, and the illumination device 310 may accommodate therein with, for example, an LED lamp and may be operated by the battery 330.

Meanwhile, the front surface of the illumination device 310 may be selectively covered by the cover 320, in which the cover 320 may be rotatably coupled to the illumination device 310 through the hinge 30 to cover or open a front portion of the illumination device 310 as shown in FIG. 7.

An additional sensor (not shown) may be provided to detect a movement of the cover 320 covering the illumination device, in which the sensor allows the illumination device 310 to flicker when the cover 320 covers the front portion of the illumination device 310.

For example, when the cover 320 is formed of an orange polarizing lens, as shown in FIG. 10, the light unit 300 may be attached to the exterior of the vehicle 50 to substitute for an emergency lamp.

Meanwhile, a light-diffusing reflective film may be coated on an inner surface of the cover 320. As shown in FIG. 7, the illumination device 310 is rotated by 30 degrees toward a front side of the light unit 300 to faces downward, and the cover 320 is rotated by 90 degrees with respect to the front surface of the lighting device 310 to open the front surface of the illumination device 310, so that the front portion of the illumination device 310 may be opened.

When the illumination device 310 and the cover 320 are rotated by a predetermined angle as described above, light emitted from the illumination device 310 may be reflected downward by the light-diffusing reflective film provided on an inner surface of the illumination device 310 so that the light may be irradiated downward.

In addition, the illumination device 310 may be prevented from flickering when the cover 320 opens the illumination device 310.

As shown in FIGS. 4 and 6, the second magnet member 340 coupled to the first magnet member 130 may be provided on a rear surface of the light unit 300. Similar to the first magnet member 130, each of second magnet members 340 may be provided on right and left sides.

The second magnet member 340 may be fixedly provided on the rear surface of the light unit 300. However, as shown in FIGS. 4 and 6, the second magnet member 340 is preferably tilted right and left through a support bracket 341, a rotation shaft 342, and a housing 343.

Support brackets 341 are provided on the right and left sides of the rear surface of the light unit 300, and the rotation shaft 342 is provided at an end of the support bracket 341.

In addition, the housing 343 is coupled to the rotation shaft 342 so as to be rotatable left and right, in which the housing 343 may be accommodated therein with the second magnet member 340.

Since the housing 343 is rotatable left and right as described above, for example, even when the light unit 300 is to be installed on a curved surface of a trunk of the vehicle 50 as shown in FIG. 10, the housing 343 is tilted by the rotation shaft, so that the light unit 300 may be easily attached to the curved surface.

In this case, it is natural that the trunk of the vehicle 50 is formed of a metal material.

Next, the second detection sensor S2 will be described.

The second detection sensor S2 is a member provided on the rear surface of the light unit 300 described above, and as shown in FIG. 4, the second detection sensor S2 is provided on an upper rear surface of the light unit 300.

The second detection sensor S2 as described above is activated by approaching the first detection sensor S1 described above. In order to activate the second detection sensor S2, the light unit 300 has to be vertically inverted as shown in FIGS. 2 and 3.

In other words, the second detection sensor S2 is activated when the light unit 300 is vertically inverted and installed on the fixing plate 100.

In a state in which the second detection sensor S2 is activated, the fire detection sensor S3 and the buzzer B shown in FIGS. 1 and 6 may be operated, in which the fire detection sensor S3 and the buzzer B may be provided on an upper surface of the light unit 300.

The fire detection sensor S3 and the buzzer B may be attached to the fixing plate 100 with the light unit 300 being vertically inverted so as to face the floor surface, so that a fire may be detected rapidly in the event of a fire.

An operation principle of the fire detection sensor S3 is that smoke generated during the fire is detected by a light reception element RD due to infrared scattering of a light emitting element LED, and a slight voltage current of the light reception element is amplified in a circuit. The amplified voltage current may turn on a relay on the circuit, so that the illumination device may start flickering simultaneously with a strong alarm sound of the buzzer B.

Hereinafter, an operation state when a fire is detected will be described by using the lighting device which can be used for the camping and leisure and has the vehicle safety warning light and fire detection functions, which has a configuration as described above, with reference to FIG. 11.

First, when the user installs the present invention in a room, the user installs the base plate 400 in the room. For example, the base plate 400 may be installed by using a double-sided tape (not shown) on a relatively flat surface such as a wall or a window.

Then, the user installs the fixing plate 100 on the front surface of the base plate 400, and attaches the fire detection sensor S3 and the buzzer B to the fixing plate 100 in a state where the light unit 300 is vertically inverted, that is, in a state where the fire detection sensor S3 and the buzzer B are directed toward a floor of the room.

When the light unit 300 is vertically inverted and attached as described above, as shown in FIG. 3, the first detection sensor S1 approaches the second detection sensor S2, so that the second detection sensor S2 is activated.

When the second detection sensor S2 is activated as described above, the fire detection sensor S3 is switched to a fire detection mode as the fire detection sensor S3 starts operating, in which the fire detection sensor S3 is maintained in a standby state when a fire is not detected by the fire detection sensor S3.

However, when a fire situation such as smoke or a toxic gas is detected by the fire detection sensor S3, the fire detection sensor S3 activates the buzzer B to notify that the fire is detected, and simultaneously allows the illumination device 310 to flicker to inform an emergency situation.

As described above, it is preferable that the illumination device 310 flickers regardless of whether the cover 320 is covering the front portion of the illumination device 310 in the fire situation.

Generally, power supply is cut off by a circuit breaker (not shown) in the fire situation. Accordingly, the illumination device 310 may be switched to a normal mode when the user in the room separates the light unit 300 from the fixing plate 100 in the fire situation.

The switching to the normal mode as described above is performed by detecting the second detection sensor S2 being separated from the first detection sensor S1.

Accordingly, the illumination device 310 is switched to the normal mode, so that the illumination device 310 used as an emergency lamp may be used as a continuous lamp, and thus the illumination device 310 may sufficiently serve as a lamp even in a room where the power supply is cut off.

In other words, after recognizing the event of a fire, the illumination device 310 separated from the fixing plate 100 may be automatically switched from a flickering mode to a continuous lighting mode so as to serve as a powerful leading light to help fire evacuation, and may be a first compact, portable and multi-purpose illumination device that serves as a perfect leading light by a straight-through transmissive yellow special polarizing lens (yellow-based transparent polarizing lens) which allows an evacuation route to be identified through the smoke in a thick smog situation during evacuation.

Optimal embodiments have been described in the drawings and specification. Although specific teams are used herein, the terms are used for purposes of describing the present invention, but are not used to limit the meanings or the scope of the present invention as defined by the appended claims. Therefore, it will be understood by those skilled in the art that various modifications and equivalent embodiments are possible without departing from the scope of the present invention. Accordingly, the technical scope of the present invention should be defined by the technical idea of the appended claims.

The invention claimed is:

1. A lighting device equipped at all times in a vehicle, which is used for camping and leisure and has vehicle safety warning light and fire detection functions, the lighting device comprising:
   a fixing plate having a rectangular shape, and provided with a pair of first magnet members which are disposed on right and left sides of the fixing plate;
   a first detection sensor provided on a lower front surface of the fixing plate;
   a "C"-shaped front insertion groove formed in a front surface of the fixing plate while being adjacent to edges of the fixing plate excluding an upper edge of the fixing plate;
   a "C"-shaped first support member selectively fixed to the front insertion groove and rotatable toward a front side of the fixing plate through a hinge;
   a pair of side insertion grooves formed vertically on both sides of the fixing plate;
   a pair of second support members respectively coupled to insides of the side insertion grooves through a hinge, and unfolded in a direction opposite to the first support member;
   a light unit provided on a rear surface thereof with a second magnet member detachably attached to the first magnet member, accommodated therein with a battery, and provided on a front surface thereof with an illumination device;
   a second detection sensor provided on an upper rear surface of the light unit, and activated by approaching the first detection sensor when the light unit is vertically inverted and attached to the fixing plate by a user;
   a fire detection sensor provided on an upper surface of the light unit, operated only when the second detection sensor is in an activation state, and activated when a fire is detected;
   a buzzer provided on the upper surface of the light unit, and activated when the fire detection sensor is activated; and
   a cover rotatably coupled to the light unit through a hinge to selectively cover the illumination device,
   wherein the illumination device flickers when the illumination device is covered by the cover.

2. The lighting device of claim 1, further comprising:
   a base plate having a rear surface attached to a window in the vehicle or a place for fixing the fixing plate, and provided on a front surface thereof with a plurality of coupling protrusions for coupling the base plate to the fixing plate; and
   a coupling hole formed in the fixing plate, and having a predetermined vertical length, in which each of the coupling protrusions is fixedly fitted to the coupling hole.

3. The lighting device of claim 1, further comprising:
   support brackets formed on right and left sides of the rear surface of the light unit;
   a rotation shaft provided at an end of the support bracket; and
   a housing coupled to the rotation shaft to rotate right and left, and accommodated therein with a second magnet member,
   wherein, when the light unit is attached to a curved surface, the light unit is tilted by the rotation shaft and attached to the curved surface of an exterior of the vehicle,
   the first support member is rotated and unfolded toward the front side when the light unit is coupled to the fixing plate, which is disposed at an outside of a tent, from an inside of the tent, and
   the second support member is unfolded in the direction opposite to the first support member to generate a tension in a cloth of the tent by a magnetic force of the first magnet member and the second magnet member such that the light unit and the fixing plate are fixed to the tent.

* * * * *